(12) United States Patent
Xiao

(10) Patent No.: US 6,402,318 B1
(45) Date of Patent: Jun. 11, 2002

(54) MAGNETIC SHELTER FRAME FOR GLASSES

(76) Inventor: Tony Xin Xiao, 1235 Lindengrove Ave., Rowland Heights, CA (US) 91748

( * ) Notice: Subject to any disclaimer, the term of this patent is extended or adjusted under 35 U.S.C. 154(b) by 0 days.

(21) Appl. No.: 09/656,906

(22) Filed: Sep. 7, 2000

Related U.S. Application Data

(60) Provisional application No. 60/197,361, filed on Apr. 15, 2000.

(51) Int. Cl.$^7$ ................................................ G02C 7/08
(52) U.S. Cl. .............................. 351/57; 351/47; 351/90
(58) Field of Search .......................... 351/47, 57, 90, 351/98

(56) References Cited

U.S. PATENT DOCUMENTS 5,936,700 A * 8/1999 Masunaga .................... 351/47
6,116,732 A * 9/2000 Xiao .......................... 351/47
6,149,269 A * 11/2000 Madison ...................... 351/47

* cited by examiner

*Primary Examiner*—Huy Mai
(74) *Attorney, Agent, or Firm*—Raymond Y. Chan; David and Raymond Patent Group

(57) ABSTRACT

A magnetic shelter frame is adapted for detachably mounting on a primary spectacle frame which includes a frame body having a pair of lens rims for mounting a pair of lenses in position wherein each lens rim includes a frame locker for securely locking up the lens within the respective lens rim. The frame body includes a primary bridge connected between the two lenses and two side extensions provided at two outer sides of the lenses respectively each having a hinge portion rearwardly extended therefrom for pivotally coupling a temple. The shelter frame for supporting two auxiliary lenses includes a bridge extended between the two auxiliary lenses, two side interlocking means provided at two sides of the auxiliary lenses respectively for interlocking with the two frame lockers of the frame body of the primary spectacle frame so as to securely mount the shelter frame in front of the primary spectacle frame.

32 Claims, 12 Drawing Sheets

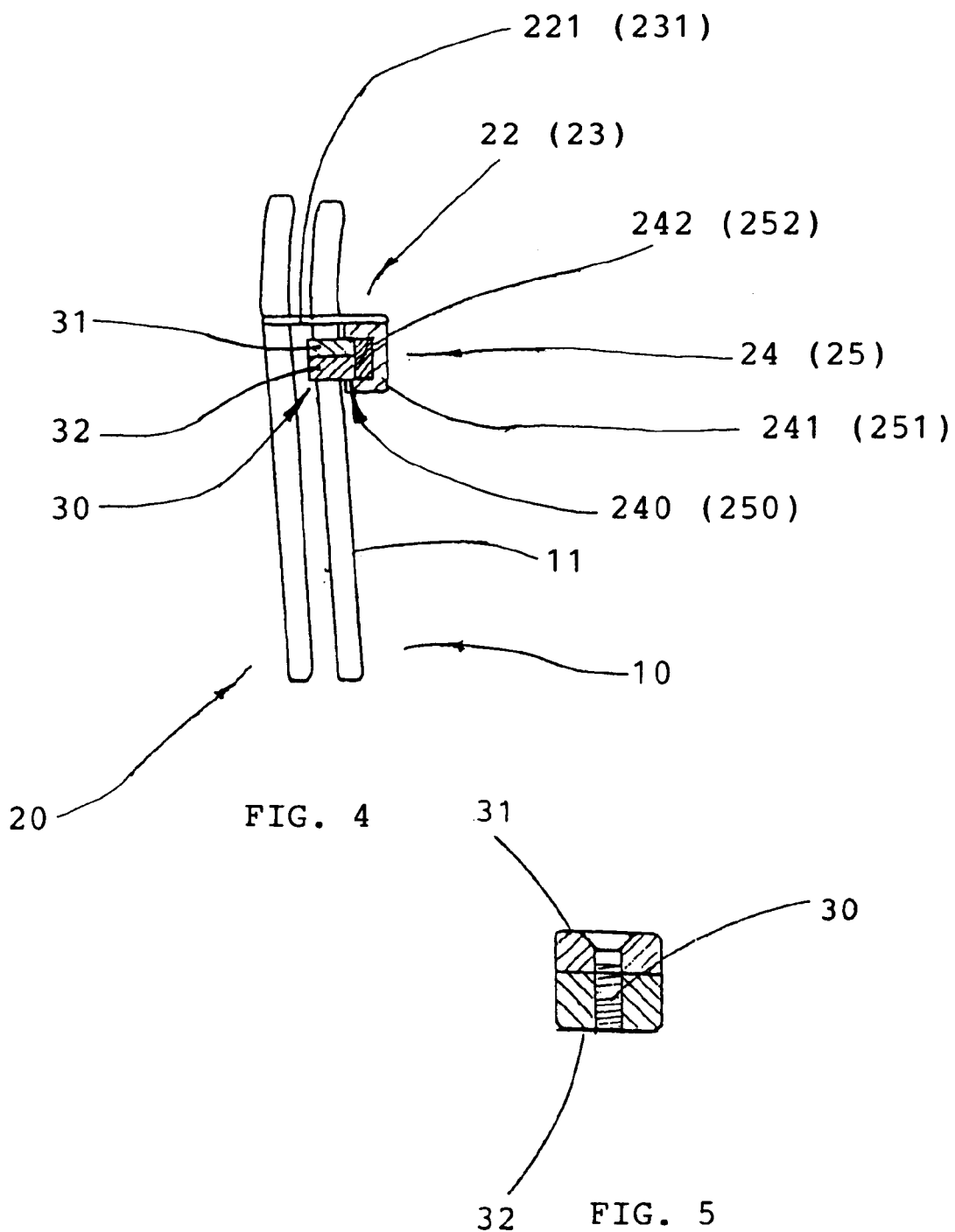

MAGNETIC SHELTER FRAME FOR GLASSES

CROSS REFERENCE OF RELATED APPLICATION

This is a regular application of a provisional application, application No. 60/197,361, filed on Apr. 15, 2000.

BACKGROUND OF THE PRESENT INVENTION

1. Field of Invention

The present invention relates to a spectacle frame, and more particularly to a magnetic shelter frame for supporting auxiliary lenses, such as sunglasses, wherein the magnetic shelter frame is adapted for detachably mounting on a primary spectacle frame by means of a magnetic attraction and an interlocking engagement.

2. Description of Related Arts

An auxiliary shelter frame is widely used today for mounting on a primary spectacle frame, especially an auxiliary shelter frame with magnetic attachment is even commonly used in recent market. The advantage of the magnetic shelter frame is that when the shelter frame is placed in front of the primary spectacle frame, due to the magnetic attraction, the shelter frame will be automatically guided and attracted by the primary spectacle frame having magnets embedded thereon, so as to securely mount the shelter frame in front of the primary spectacle frame. Thus, the wearer can easily use one hand to attach or detach the shelter frame during exercising or driving.

However, the conventional shelter frame may have drawbacks in practical use. Since the primary spectacle frame comprises magnets embedded thereon, which will increase the weight of the primary spectacle frame, such that the wearer may feel uncomfortable because of the additional weight of the primary spectacle frame even though the shelter frame is detached therefrom. Moreover, it is known that the magnets produce magnetic field which may affect the blood circulation of a human being. When the wearer always wear the primary spectacle frame having the magnets embedded thereon, the magnetic field produced by those magnets may cause eye infection or even serious headache for the wear. Thus, the magnets embedded on the primary spectacle frame may not only adversely affect the entire ornamental appearance of the primary spectacle frame but also limit the designers to create and design new style of the frames in the fashion market.

SUMMARY OF THE PRESENT INVENTION

A main object of the present invention is to provide a magnetic shelter frame for spectacle frame which comprises a pair of frame lockers for interlocking two lenses in position, wherein the frame lockers are made of soft-magnetic metal having magnetic attraction ability such that no magnet is needed to embed on the primary spectacle frame. In other words, the primary spectacle frame does not require to alter the original structural design.

Another object of the present invention is to provide a magnetic shelter frame for spectacle frame, wherein the magnetic shelter frame can be precisely and easily attached on a primary spectacle frame by magnetic attraction. Moreover, the shelter frame is arranged to interlock with the primary spectacle frame so that the shelter frame is securely mounted on the primary spectacle frame.

Another object of the present invention is to provide a magnetic shelter frame for spectacle frame, wherein the arms of the magnetic frame not only is magnetically attracted to the two frame lockers of the primary spectacle frame, but also is arranged to engage with the two frame lockers of the primary spectacle frame, so as to prevent up and down movement or sideward movement of the magnetic shelter frame with respect to the primary spectacle frame once the magnetic shelter frame is mounted in position.

Another object of the present invention is to provide a magnetic shelter frame for spectacle frame, wherein even though the magnetic shelter frame is magnetically attracted and engaged with the primary spectacle frame, the wearer still may merely use one hand to attach or detach the shelter frame during exercising or driving.

Another object of the present invention is to provide a magnetic shelter frame for spectacle frame, wherein no magnet is needed to embed on the primary spectacle frame so as to further reduce the weight of the primary spectacle frame. Furthermore, the ornamental appearance of the primary spectacle frame can be maintained wherein the primary spectacle frame is exactly identical to a common spectacle frame even though the magnetic shelter frame is removed.

Another object of the present invention is to provide a magnetic shelter frame for spectacle frame wherein the primary spectacle frame does not require to alter its original structural design, so as to minimize the manufacturing cost of the primary spectacle frame incorporating with the magnetic shelter frame.

Accordingly, in order to accomplish the above objects, the present invention provides a magnetic shelter frame adapted for detachably mounting in front of a primary spectacle frame which comprises a frame body having a pair of lens rims for mounting a pair of lenses in position wherein each lens rim comprises a frame locker for securely locking up the lens within the respective lens rim. The frame body comprises a primary bridge connected between the two lenses and two side extensions provided at two outer sides of the lenses respectively each having a hinge portion rearwardly extended therefrom for pivotally coupling a temple.

The shelter frame for supporting two auxiliary lenses comprises a bridge extended between the two auxiliary lenses, two side interlocking means provided at two sides of the auxiliary lenses respectively for interlocking with the two frame lockers of the frame body of the primary spectacle frame so as to securely mount the shelter frame in front of the primary spectacle frame.

Each of the interlocking means comprises a supporting arm rearwardly extended from the shelter frame, and a magnetic seat which comprises a magnet housing downwardly connected from the supporting arm for magnetically attracting from behind the frame body and engaging with the respective frame locker, so as to mount the shelter frame in front of primary spectacle frame.

In order to mount the shelter frame in front of the frame body of the primary spectacle frame, simply put the shelter frame in front of the primary spectacle frame and drop it down. Due to the magnetic attraction, the two magnetic seats of the shelter frame are magnetically attracted from behind to engage with the two frame lockers of the frame body of the primary spectacle frame respectively. Thus, the two interlocking means of the shelter frame are respectively interlocked with the frame body of the primary spectacle frame. So, the present invention provides not only the magnetic attraction but also the interlocking engagement for securely mounting the shelter on the primary spectacle frame.

BRIEF DESCRIPTION OF THE DRAWINGS

FIG. 4 is a partially sectional view of the magnetic shelter frame mounted on the primary spectacle frame according to the above first preferred embodiment of the present invention.

FIG. 5 is a partially sectional of the frame locker of the primary spectacle frame according to the above first preferred embodiment of the present invention.

DETAILED DESCRIPTION OF THE PREFERRED EMBODIMENT

Figure 1:
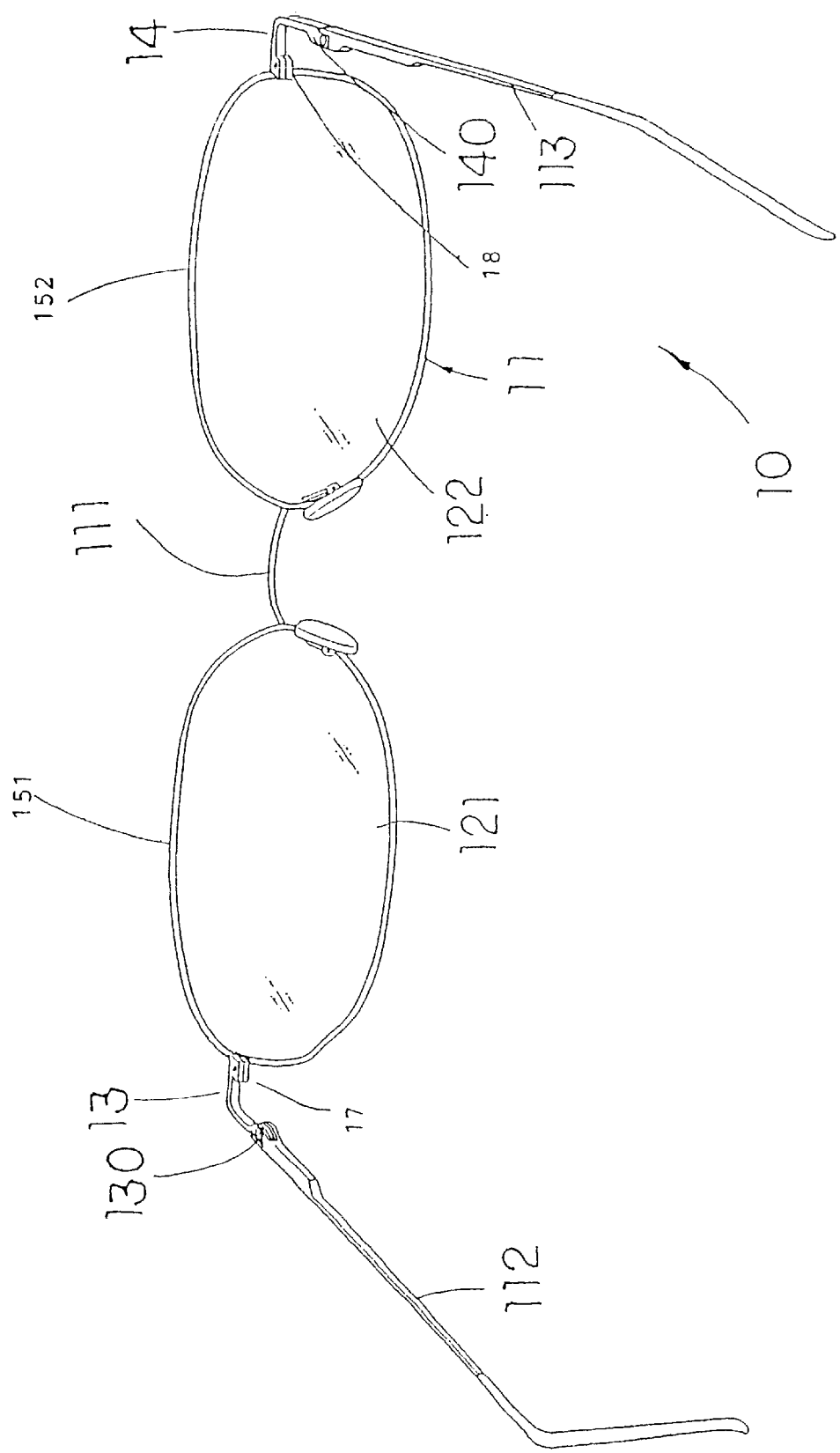
FIG. 1 is a rear perspective view of a primary spectacle frame according to a first preferred embodiment of the present invention.
Figure 2:
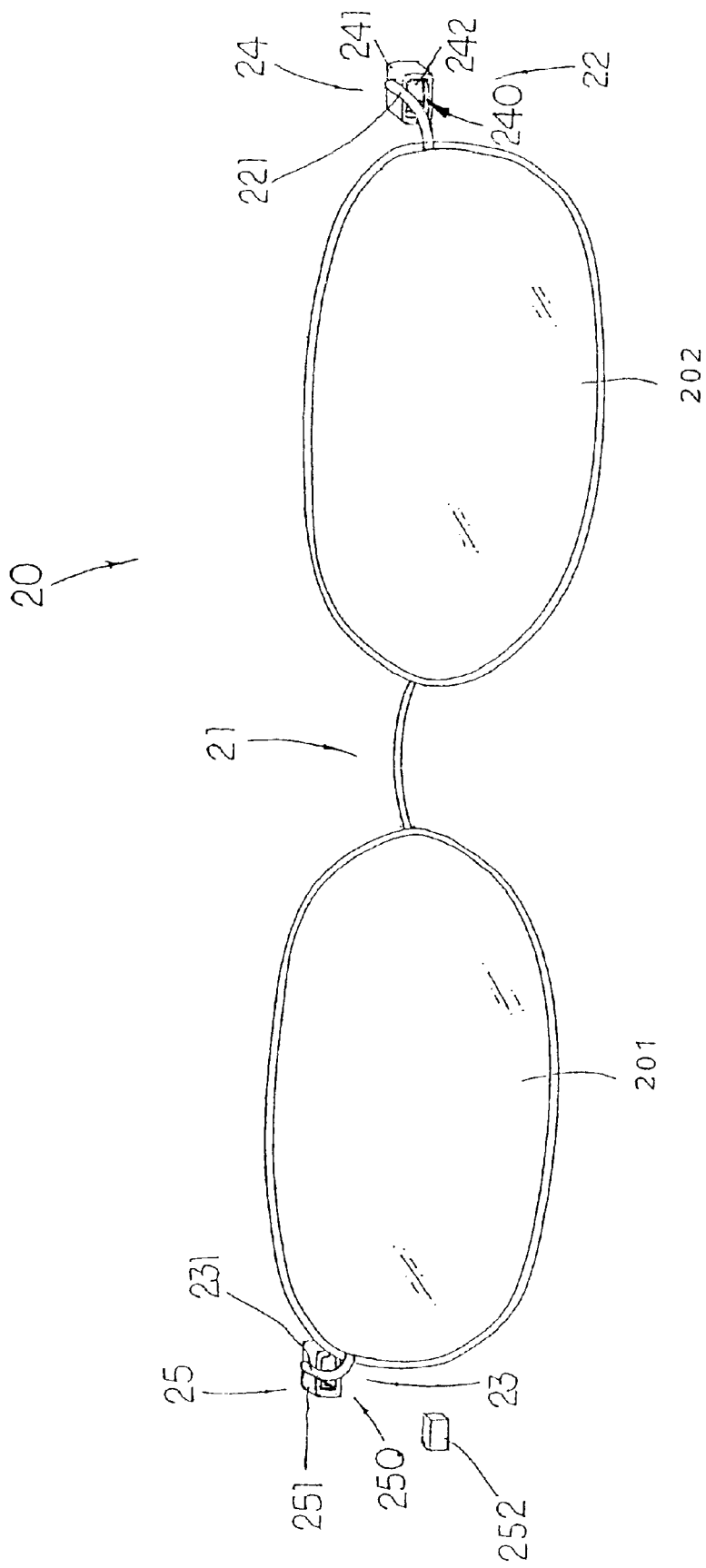
FIG. 2 is a front perspective view of a magnetic shelter frame according to the above first preferred embodiment of the present invention.
Figure 3:
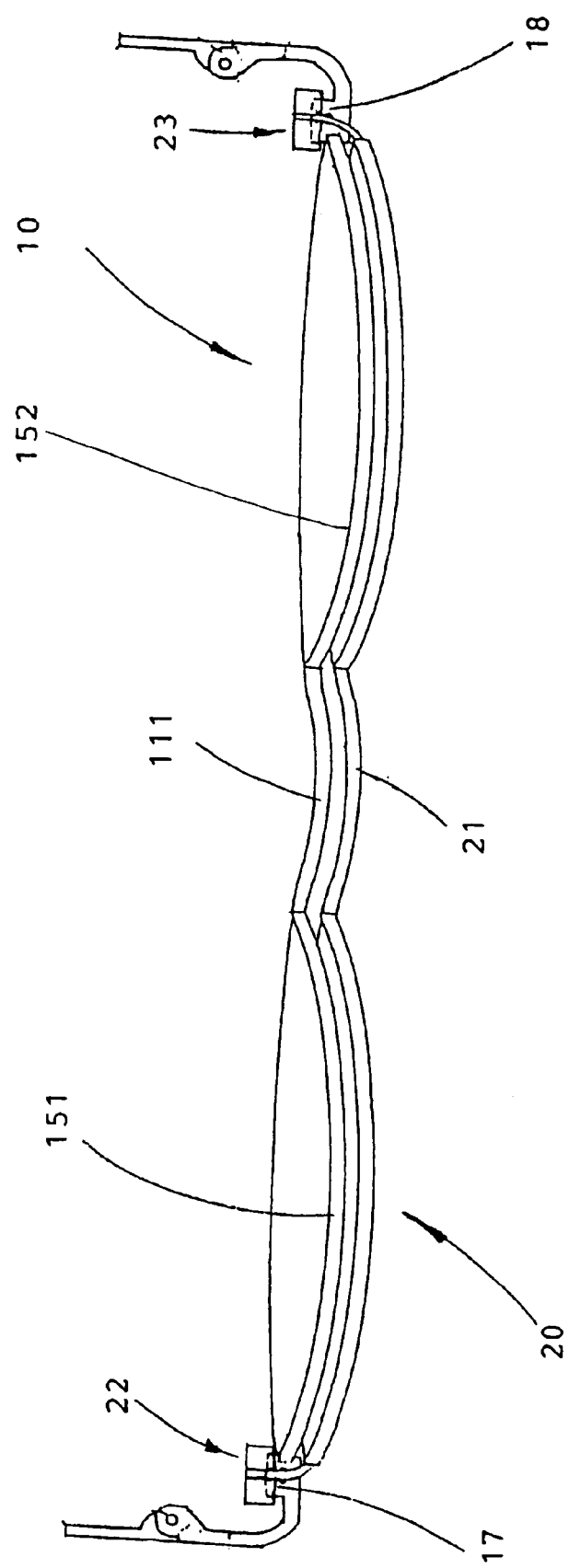
FIG. 3 is a top view of the magnetic shelter frame mounted on the primary spectacle frame according to the above first preferred embodiment of the present invention.

Referring to FIGS. 1 to 3 of the drawings, a magnetic shelter frame 20 adapted for detachably mounting in front of a primary spectacle frame 10 according to a first preferred embodiment of the present invention is illustrated. The primary spectacle frame 10 comprises a frame body 11 having a pair of lens rims 151, 152 for mounting a pair of lenses 121, 122 in position wherein each lens rim 151, 152 comprises a frame locker 17, 18 for securely locking up the lens 121, 122 within the respective lens rim 151, 152. The frame body 11 comprises a primary bridge 111 connected between the two lens rims 151, 152 and two side extensions 13, 14 provided at two outer sides of the lenses 121, 122 respectively each having a hinge portion 130, 140 rearwardly extended therefrom for pivotally coupling a temple 112, 113.

As shown in FIGS. 1, 3, 4, and 5, according to the first preferred embodiment of the present invention, each of the frame lockers 17, 18 is connected between the lens rim 151, 152 and the side extension 13, 14, wherein each frame locker 17, 18 comprises a first rimlock member 31, a second rimlock member 32, and a screw 30 for holding the first and second rimlock members 31, 32 together, as shown in FIG. 5. According to the first preferred embodiment, the two frame lockers 17, 18 are positioned adjacent toe the two side extensions 13, 14 respectively. Each frame locker 17, 18 can be shaped as different size and shape such as rectangular, square, or oval cross-sectional structure according to the size and shape of the respective lens rim 151, 152. The frame lockers 17, 18 are made of soft-magnetic metal having magnetic attraction ability such as mild steel, low carbon steel and high grade steel, which is attractive to magnetic material such as permanent magnet.

Each shelter frame 20 for supporting two auxiliary lenses 201, 202 comprises a bridge extended between the two auxiliary lenses 201, 202, two side interlocking means 22, 23 which are provided at two outer sides of the two auxiliary lenses 201, 202 respectively for interlocking with the two frame lockers 17, 18 of the frame body 11 of the primary spectacle frame 10 so as to securely mount the shelter frame 20 on the primary spectacle frame 10. The auxiliary lenses 201, 202 can be shaded lenses supported by the shelter frame 20 to form a detachable sunglasses.

Each of the interlocking means 22, 23 comprises a supporting arm 221, 231 rearwardly extended over the respective side extension 13, 14 of the frame body 11 of the primary spectacle frame 10 without contacting the two side extensions 13, 14, and a magnetic seat 24, 25 downwardly connected from the supporting arm 221, 231 for magnetically attracting from behind the respective frame locker 17, 18 and engaging with the respective frame locker 17, 18, so that the magnetic seats 24, 25 secure the shelter frame 20 in front of the primary spectacle frame 10.

Each of the magnetic seats 24, 25 comprises a magnetic housing 241, 251, which is made of non-magnetic material or soft-magnetic metal having magnetic attraction ability such as mild steel, low carbon steel and high grade steel, downwardly or upwardly connected from the respective supporting arm 221, 231 and a magnet 242, 252 mounted in the magnet housing 241, 251 which is arranged to face toward and align with the respective frame locker 17, 18 of the respective lens rim 151, 152 when the shelter frame 20 is mounted on the frame body 11 of the primary spectacle frame 10.

Accordingly, the thickness of the two magnets 242, 252 are respectively smaller than the depth of the two magnet housing 241, 251 so as to define two engagement grooves 240, 250 when the two magnets 242, 252 are respectively embedded in the two magnet housing 241, 251 for engaging with the two frame lockers 17, 18 of the frame body 11 of the primary spectacle 10. Thus, the two indented engagement grooves 240, 250 of the magnet housing 241, 251 have a corresponding size and shape of the two frame lockers 17, 18 respectively so that the two frame lockers 17, 18 can be fittedly engaged into the two engagement grooves 240, 250 when the shelter frame 20 is mounted on the primary spectacle frame 10 as shown in FIG. 4, so as to further interlock the shelter frame 20 with the primary spectacle frame 10 by preventing any upward, downward, leftward, and rightward movement of the shelter frame 20.

As shown in FIGS. 3 and 4, when the two supporting arms 221, 231 extend over the two side extensions 13, 14 respectively, the two magnetic seats 24, 25 will attract from behind with the two frame lockers 17, 18 of the frame body 11 of the primary spectacle frame 10 respectively until the two frame lockers 17, 18 are received in the engagement grooves 240, 250 respectively, so that the two magnetic seats 24, 25 firmly engage the shelter frame 20 with the primary spectacle frame 10 in an interlocking manner.

In order to mount the shelter frame 20 in front of the frame body 11 of the primary spectacle frame 10, the user may simply use one hand to put the shelter frame 20 in front of the primary spectacle frame 10 and drop it down. Due to the magnetic attraction, the two magnetic seats 24, 25 of the shelter frame 20 are magnetically attracted from behind to engage with the two frame lockers 17, 18 of the frame body 11 of the primary spectacle frame 10 respectively. Moreover, the two frame lockers 17, 18 can further guide the two magnetic seats 24, 25 to automatically align and attract with the two engagement grooves 240, 250 thereof respectively. Thus, the two interlocking means 22, 23 of the shelter frame 20 are respectively interlocked with two side extensions 13, 14 of the frame body 11. So, the present invention provides not only the magnetic attraction but also the interlocking engagement for securely mounting the shelter frame 20 on the primary spectacle frame 10.

According to the present invention, the user can also detach the shelter frame 20 from the primary spectacle frame 10 easily by slightly pushing the shelter frame 20 towards the primary spectacle frame 10 until the two magnetic seats 24, 25 of the two interlocking means 22, 23 move rearwardly apart from the two frame lockers 17, 18, so that the magnetic attraction and mechanical engagement between the shelter frame 20 and the primary spectacle frame 10 are released at the same time, and then the user may detach the shelter frame 20 by simply lifting it up from the primary spectacle frame 10 with one hand.

Figure 6:
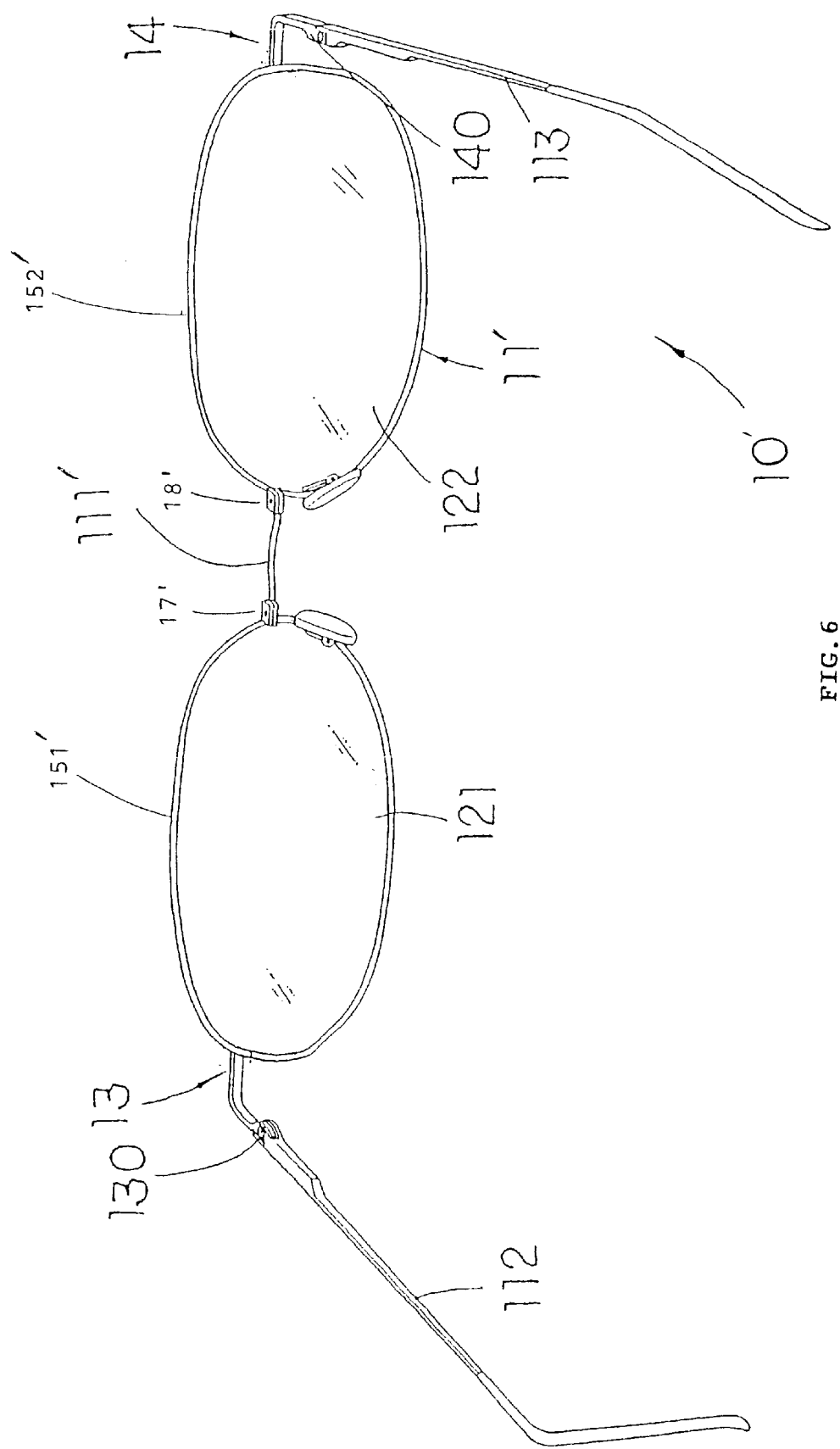
FIG. 6 is a rear perspective view of a primary spectacle frame according to a second preferred embodiment of the present invention.
Figure 7:
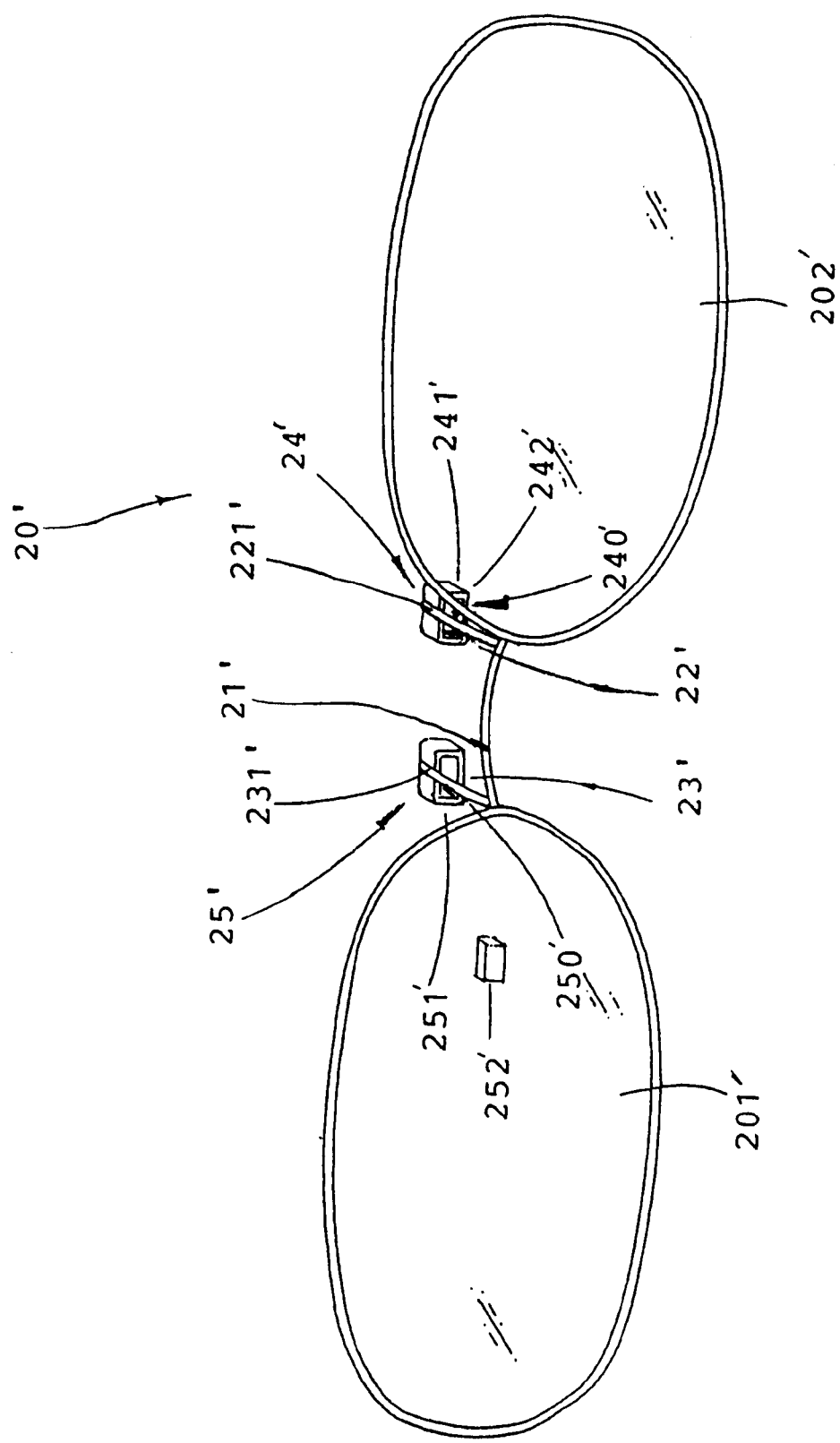
FIG. 7 is a front perspective view of a magnetic shelter frame according to the above second preferred embodiment of the present invention.
Figure 8:
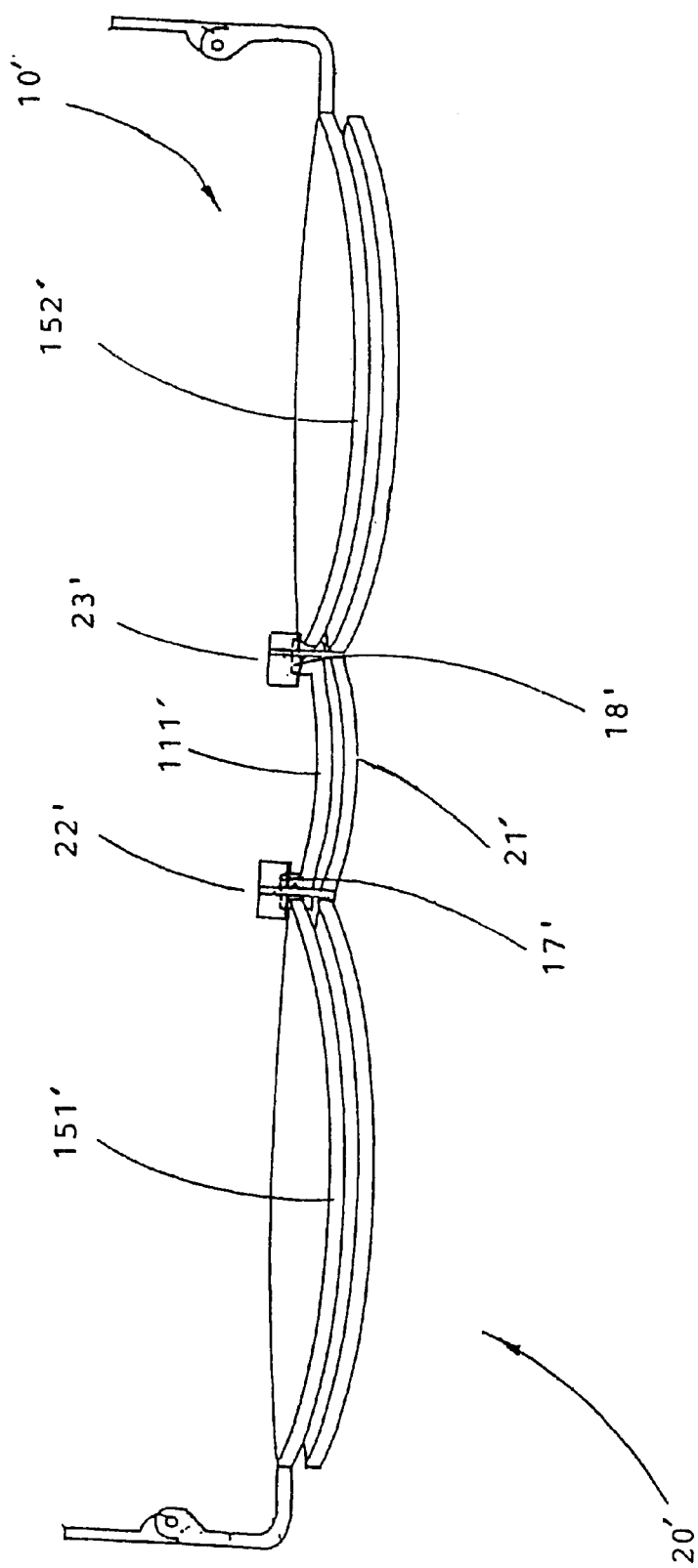
FIG. 8 is a top view of the magnetic shelter frame mounted on the primary spectacle frame according to the above second preferred embodiment of the present invention.

Referring to FIGS. 6, 7, and 8 of the drawings, a primary spectacle frame 10' and a magnetic shelter frame 20' according to a second preferred embodiment of the present invention are illustrated, wherein the attraction and engagement concepts of the second embodiment is the same as the above first embodiment. The modification in the second embodiment includes the location of the frame lockers 17', 18' of the frame body 11'. Accordingly, the two frame lockers 17', 18' are respectively mounted on two inner sides of the two lens rims 151', 152', which are adjacent to two ends of the primary bridge 111' respectively, as shown in FIG. 6.

The two interlocking means 22', 23', made of soft magnetic metal as the interlocking means 22, 23 of the first embodiment, are provided at two inner sides of the two auxiliary lenses 201', 202' respectively, that is two ends of the bridge 21' of the shelter frame 20', for interlocking with the primary bridge 111' of the primary spectacle frame 10'. Each interlocking means 22', 23' comprises the supporting arm 221', 231' rearwardly extended over the primary bridge 111' of the primary spectacle frame 10' from the respective end of the bridge 21' of the shelter frame 20', and the magnetic seat 24', 25' downwardly connected from the supporting arm 221', 231' for magnetically attracting from behind the primary bridge 111' and engaging with the respective frame locker 17', 18' so as to securely mount the shelter frame 20' in front of the primary spectacle frame 10'. Each of the magnetic seats 24', 25' has the same structure of the magnetic seat 24, 25 of the first embodiment.

Each of the magnetic seats 24', 25' also comprises a magnetic housing 241', 251', which is made of non-magnetic material or soft-magnetic metal having magnetic attraction ability such as mild steel, low carbon steel and high grade steel, downwardly or upwardly connected from the respective supporting arm 221', 231' and a magnet 242', 252' mounted in the magnet housing 241', 251' which is arranged to face toward and align with the respective frame locker 17', 18' when the shelter frame 20' is mounted on the frame body 11' of the primary spectacle frame 10'.

Similarly, the thickness of the two magnets 242', 252' are respectively smaller than the depth of the two magnet housing 241', 251' so as to define two engagement grooves 240', 250' when the two magnets 242', 252' are respectively embedded in the two magnet housing 241', 251' for engaging with the two frame lockers 17', 18' of the frame body 11' of the primary spectacle 10'. Thus, the two indented engagement grooves 240', 250' of the magnet housing 241', 251' have a corresponding size and shape of the two frame lockers 17', 18' respectively so that the two frame lockers 17', 18' can be fittedly engaged into the two engagement grooves 240', 250' when the shelter frame 20' is mounted on the primary spectacle frame 10' as shown in FIG. 8, so as to further interlock the shelter frame 20' with the primary spectacle frame 10' by preventing any upward, downward, leftward, and rightward movement of the shelter frame 20'.

Figure 9:
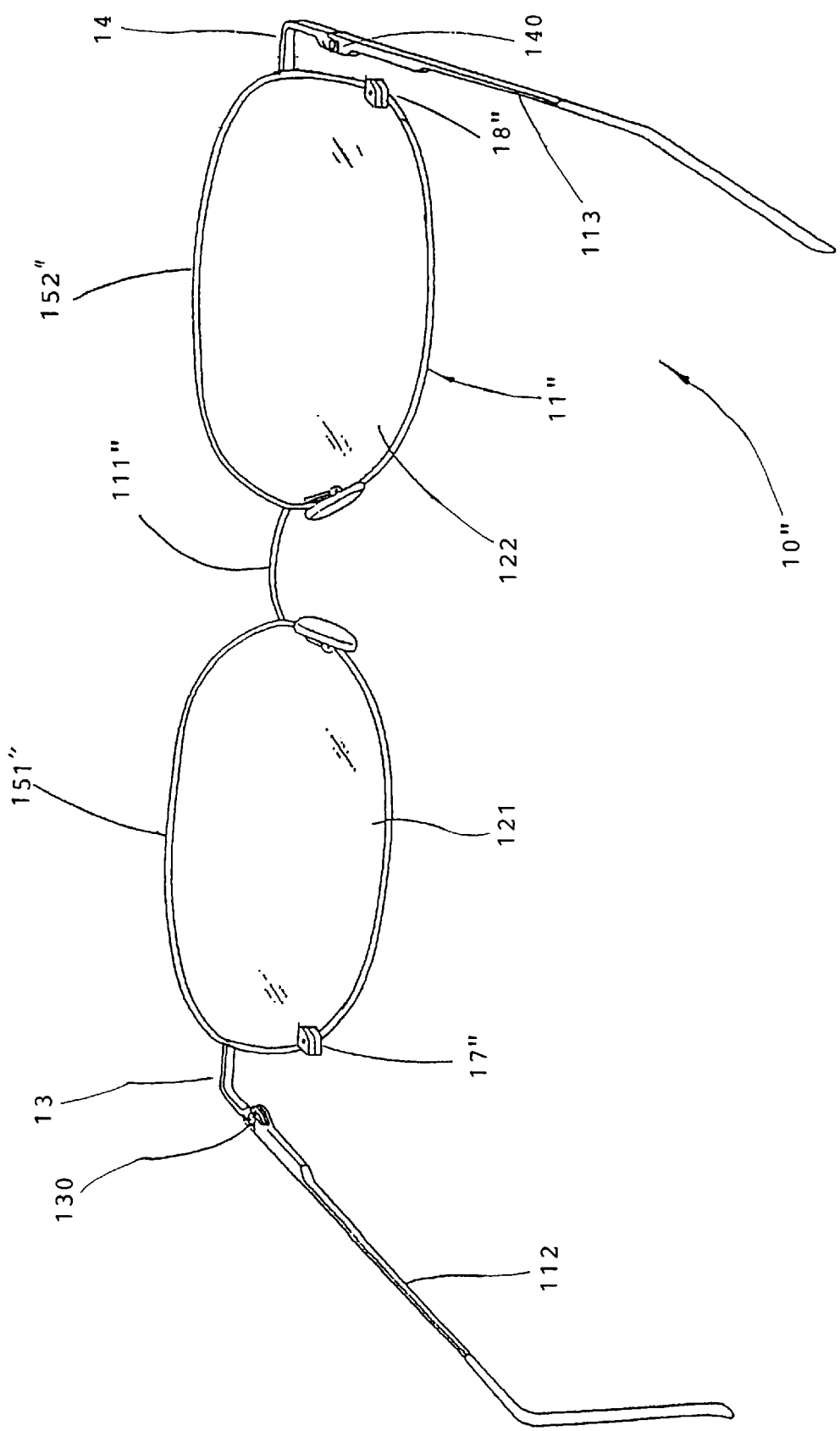
FIG. 9 is a rear perspective view of a primary spectacle frame according to a third preferred embodiment of the present invention.
Figure 10:
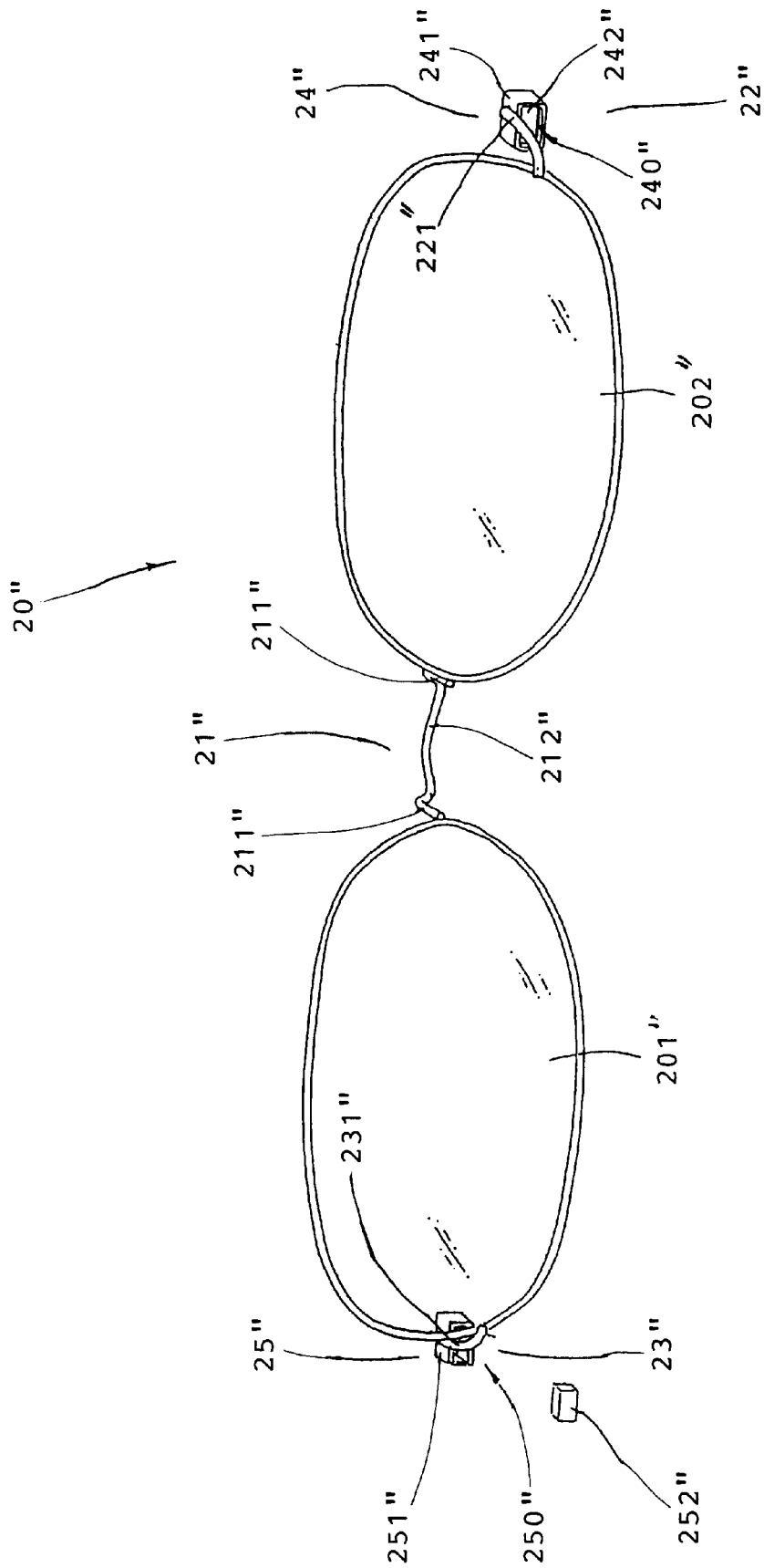
FIG. 10 is a front perspective view of a magnetic shelter frame according to the above third preferred embodiment of the present invention.
Figure 11:
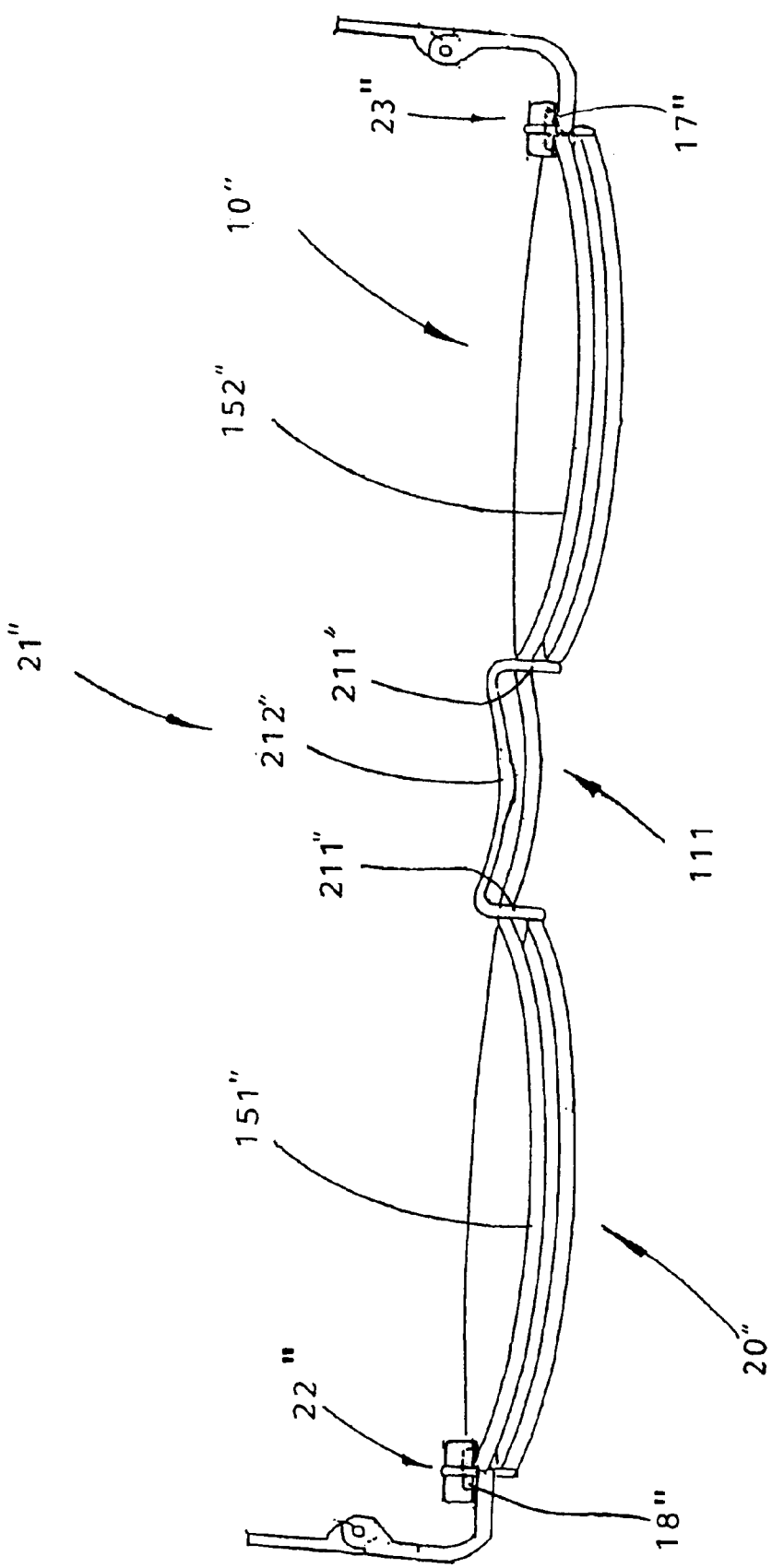
FIG. 11 is a top view of the shelter frame mounted on the primary spectacle frame according to the above third preferred embodiment of the present invention.

Referring to FIGS. 9 to 11, a primary spectacle frame 10" and a magnetic shelter frame 20" according to a third preferred embodiment of the present invention is illustrated, wherein the two frame lockers 17", 18" are respectively mounted on two lower portions of the two lens rims 151", 152" of the primary spectacle frame 10".

According to the third embodiment, the two interlocking means 22", 23" are provided at two lower portions of the two auxiliary lenses 201", 202" respectively wherein each interlocking means 22", 23" has an identical structure of the interlocking means 22, 23 and 22', 23' as described in the above first and second embodiments that also comprises the supporting arm 221", 231" rearwardly extended from the shelter frame 20", and the magnetic seat 24", 25" downwardly connected from the supporting arm 221", 231" for magnetically attracting from behind and engaging with the respective frame locker 17", 18".

Each of the magnetic seats 24", 25" also comprises a magnetic housing 241", 251", which is made of non-magnetic material or soft-magnetic metal having magnetic attraction ability such as mild steel, low carbon steel and high grade steel, downwardly or upwardly connected from the respective supporting arm 221", 231" and a magnet 242", 252" mounted in the magnet housing 241", 251" which is arranged to face toward and align with the respective frame locker 17", 18" when the shelter frame 20" is mounted on the frame body 11" of the primary spectacle frame 10".

Similarly, the thickness of the two magnets 242", 252" are respectively smaller than the depth of the two magnet housing 241", 251" so as to define two engagement grooves 240", 250" when the two magnets 242", 252" are respectively embedded in the two magnet housing 241", 251" for engaging with the two frame lockers 17", 18" of the frame body 11" of the primary spectacle 10". Thus, the two indented engagement grooves 240", 250" of the magnet housing 241", 251" have a corresponding size and shape of the two frame lockers 17", 18" respectively so that the two frame lockers 17", 18" can be fittedly engaged into the two engagement grooves 240", 250" when the shelter frame 20" is mounted on the primary spectacle frame 10" as shown in FIG. 11, so as to further interlock the shelter frame 20" with the primary spectacle frame 10" by preventing any upward, downward, leftward, and rightward movement of the shelter frame 20'.

According to the third embodiment, the interlocking means 22", 23" further comprises a clip-bridge 21" which is the bridge of the shelter frame 20", wherein the clip-bridge 21" is generally in U-shaped and comprises two rearwardly extending side wires 211" adapted for supporting on two ends of the primary bridge 111" of the frame body 11" and a downwardly curved clipping wire 212" extending behind the primary bridge 111", so that the clip-bridge 21A is clipped on the primary bridge 111" when the shelter frame 20" is mounted on in front of the primary spectacle frame 10". So, the clip-bridge 21" of the shelter frame 20" is interlocked with the primary bridge 111" of the frame body 11" of the primary spectacle frame 10", as shown in FIG. 11.

It is worth to mention that the clip bridge 21" structure can also be incorporated in the first and second embodiments to substitute the bridge 21 and 21'.

Figure 12:
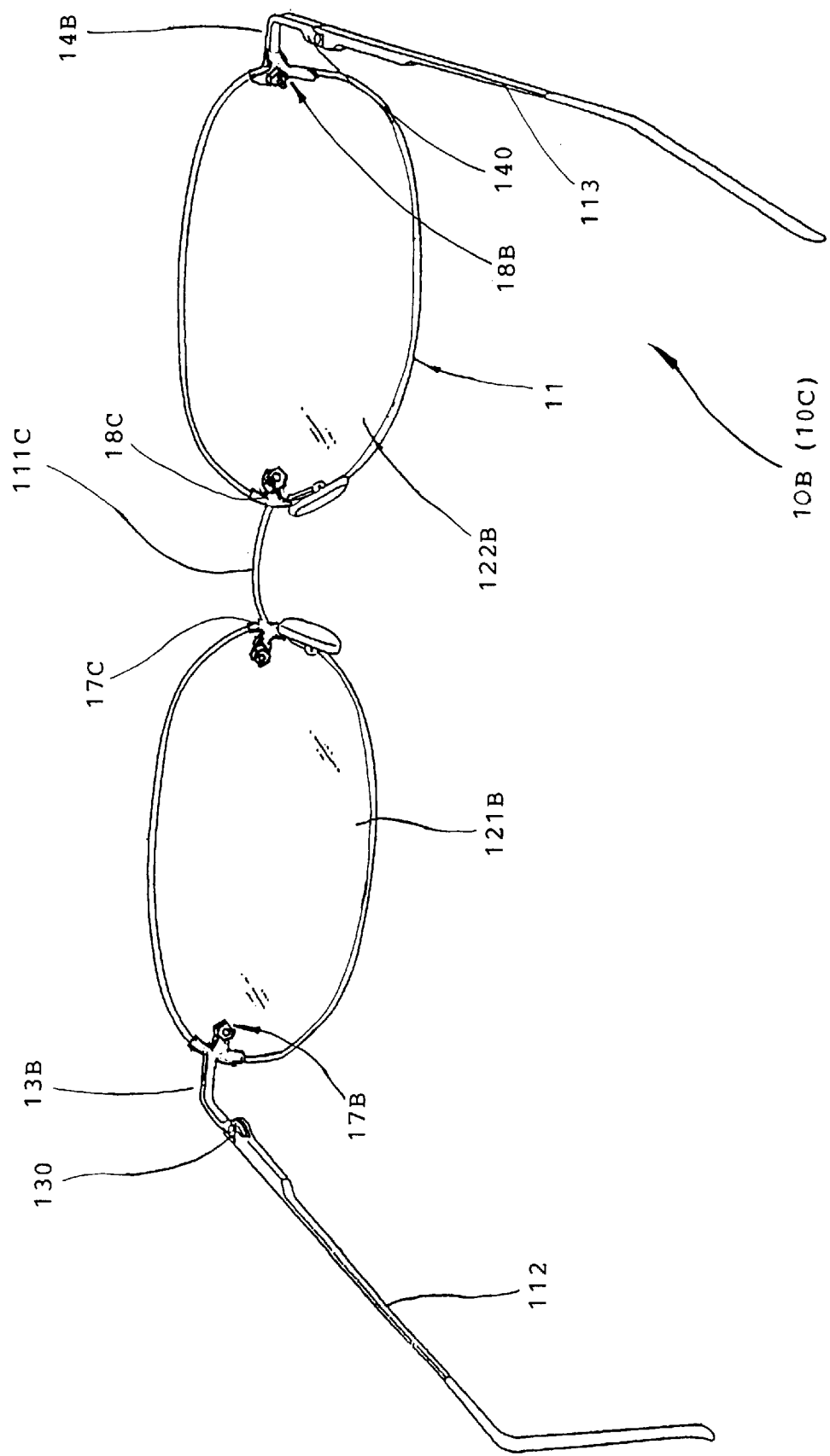
FIG. 12 is a rear perspective view of a primary spectacle frame according to a fourth preferred embodiment of the present invention.
Figure 13:
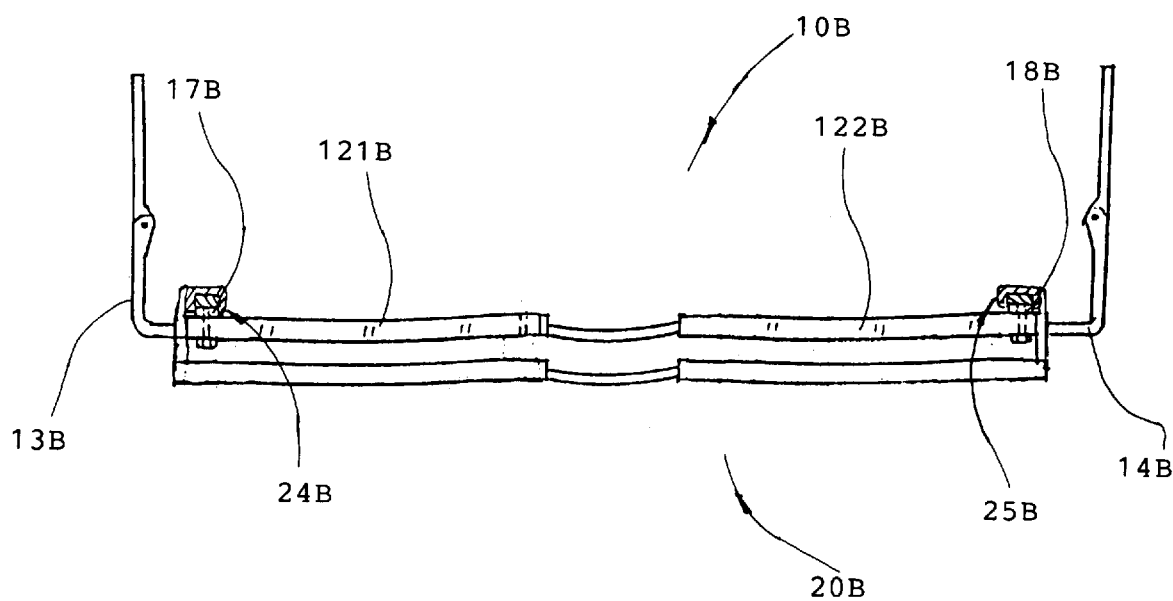
FIG. 13 is a top view of a magnetic shelter frame mounted on the primary spectacle frame according to the above fourth preferred embodiment of the present invention.
Figure 14:
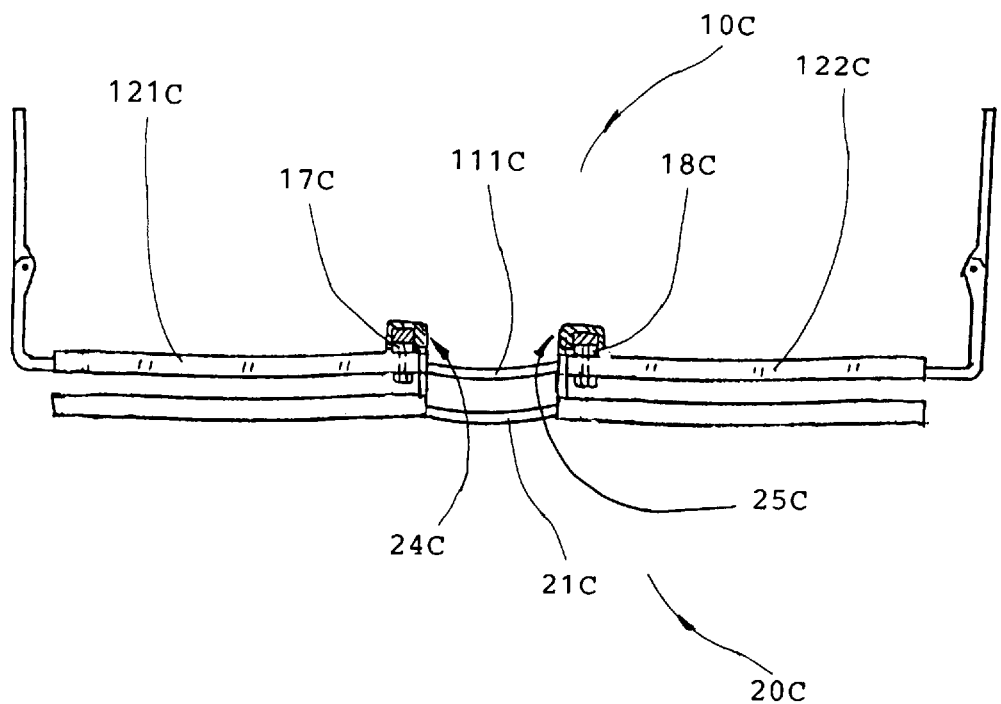
FIG. 14 illustrates an alternative mode of the magnetic shelter frame mounted on the primary spectacle frame according to the above fourth preferred embodiment of the present invention.

Referring to FIGS. 12 to 14, a fourth preferred embodiment according to the present invention is illustrated, wherein a magnetic shelter frame 20B constructed as the magnetic shelter frame 20, 20' or 20" in the above embodiments can also be used for mounting in front of a rimless primary spectacle frame 10B, as shown in FIG. 12, wherein the primary bridge 111B and the two side extensions 13B, 14B are directly fastened to the edges of the two lenses 121B, 122B.

According to the fourth embodiment, two frame locker 17B, 18B are provided at two side extensions 13B, 14B respectively. According to the fourth embodiment as shown in FIG. 12, the two frame lockers 17B, 18B are two nuts for fastening the two side extensions 13B, 14B to the two lenses 121B, 122B respectively. Each of the frame lockers 17B, 18B, i.e. the two nuts, is made of soft-magnetic metal having magnetic attraction ability such as mild steel, low carbon steel, and high grade steel, which is attracted to magnetic material such as permanent magnet the two side extensions 13B, 14B. So, the magnetic shelter frame 20B according to the fourth preferred embodiment is adapted for mounting in front of the rimless primary spectacle frame 10B while the two supporting arms 221B, 231B respectively extend over the two side extensions 13B, 14B and the two magnetic seats 24B, 25B attract from behind with the two frame lockers 17B, 18B of the two side extensions 13B, 14B, as shown in FIG. 13, wherein each of the magnetic seats 24B, 25B has a same structure as the magnetic seat 24, 25, 24', 25', 24", 25" as illustrated in the above embodiments.

Alternatively, two frame lockers 17C, 18C are provided at two ends of the primary bridge 111C for directly fastening between the two lenses 121C, 122C. The two frame lockers 17B, 18B are two nuts for fastening the two ends of the primary bridge 111C to the two lenses 121B, 122B respectively. Each of the frame lockers 17B, 18B, i.e. the two nuts, is made of soft-magnetic metal having magnetic attraction ability such as mild steel, low carbon steel, and high grade steel, which is attracted to magnetic material such as permanent magnet the two side extensions 13B, 14B. Therefore, the magnetic shelter frame 20C of the second embodiment is adapted for fittedly mounting in front of the primary spectacle frame 10C while the two supporting arms 221C, 231C extend over the primary bridge 111C and the two magnetic seats 24B, 25B respectively attract from behind with the two frame lockers 17C, 18C of the primary bridge 111C of the primary spectacle frame 10C, as shown in FIG. 14, wherein each of the magnetic seats 24C, 25C has a same structure as the magnetic seat 24, 25, 24', 25', 24", 25" as illustrated in the above embodiments.

What is claimed is:

1. A magnetic shelter frame constructed to mount on a primary spectacle frame which comprises a frame body comprising a pair of lens rims for mounting a pair of lenses in position, wherein each of said lens rims comprises a frame locker for fastening up two ends of said respective lens rim to securely lock up said respective lens within said respective lens rim, each of said frame lockers is made of magnetic attractable material, said frame body comprising a primary bridge connected between said pair of lenses and two side extensions provided at two outer sides of said lenses respectively, each of said side extensions having a hinge portion rearwardly extended therefrom for pivotally coupling a temple;

said magnetic shelter frame supporting two auxiliary lenses and comprising a bridge extended between said two auxiliary lenses, two side interlocking means provided at two sides of said auxiliary lenses respectively for interlocking with said two frame lockers of said frame body of said primary spectacle frame;

each of said interlocking means comprising a supporting arm and a magnetic seat connected from said supporting arm, wherein said two supporting arms are rearwardly extended over said two side extensions of said primary spectacle frame from said shelter frame respectively and said two magnetic seats magnetically attract from behind said two frame lockers and engage with said two frame lockers of said frame body respectively, so as to secure said magnetic shelter frame in front of said primary spectacle frame.

2. The magnetic shelter frame, as recited in claim 1, wherein said two frame lockers are made of soft-magnetic metal having magnetic attraction ability.

3. The magnetic shelter frame, as recited in claim 2, wherein said two frame lockers of said two lens rims are respectively positioned adjacent to said two side extensions of said primary spectacle frame, wherein said two supporting arms of said two interlocking means of said magnetic shelter frame are rearwardly extended over said two side extensions, without contacting said two side extensions, to interlock with said two frame lockers respectively, so that said two magnetic seats secure said magnetic shelter frame in front of said primary spectacle frame.

4. The magnetic shelter frame, as recited in claim 3, wherein each of said magnetic seats comprises a magnet housing which is made of non-magnetic material and connected to said respective supporting arm, and a magnet mounted in said magnet housing which is arranged facing toward and aligning with said respective frame locker of said respective lens rim when said shelter frame is mounted in front of said frame body of said primary spectacle frame.

5. The magnetic shelter frame, as recited in claim 4, wherein a thickness of each of said two magnets is smaller than a depth of each of said two magnet housings so as to define two engagement grooves therein when said two magnets are respectively embedded in said two magnet housings for engaging with said two frame lockers of said primary spectacle frame.

6. The magnetic shelter frame, as recited in claim 5, wherein said bridge of said shelter frame is a U-shaped clip-bridge which comprises two rearwardly extending side wires adapted for supporting on two ends of said primary bridge of said frame body, and a downwardly curved clipping wire connecting between said two side wires and extending behind said primary bridge, wherein said clip-bridge is clipped on said primary bridge for interlocking therewith when said shelter frame is mounted in front of said primary spectacle frame.

7. The magnetic shelter frame, as recited in claim 2, wherein said two frame lockers of said two lens rims are respectively positioned adjacent to two ends of said bridge, wherein said two supporting arms of said two interlocking means of said magnetic shelter frame rearwardly extended over said bridge to interlock with said two frame lockers respectively, so that said two magnetic seats secure said magnetic shelter frame in front of said primary spectacle frame.

8. The magnetic shelter frame, as recited in claim 7, wherein each of said magnetic seats comprises a magnet housing which is made of non-magnetic material and connected to said respective supporting arm, and a magnet mounted in said magnet housing which is arranged facing toward and aligning with said respective frame locker of said respective lens rim when said shelter frame is mounted in front of said frame body of said primary spectacle frame.

9. The magnetic shelter frame, as recited in claim 8, wherein a thickness of each of said two magnets is smaller than a depth of each of said two magnet housings so as to define two engagement grooves therein when said two magnets are respectively embedded in said two magnet housings for engaging with said two frame lockers of said primary spectacle frame.

10. The magnetic shelter frame, as recited in claim 2, wherein said two frame lockers of said two lens rims are rearwardly positioned at two lower sides of said two lens rims respectively, wherein said two supporting arms of said two interlocking means of said magnetic shelter frame are rearwardly extended over said two lower sides to interlock with said two frame lockers of said two lower sides of said primary spectacle frame respectively, so that said two magnetic seats secure said magnetic shelter frame in front of said primary spectacle frame.

11. The magnetic shelter frame, as recited in claim 10, wherein each of said magnetic seats comprises a magnet housing which is made of non-magnetic material and connected to said respective supporting arm, and a magnet mounted in said magnet housing which is arranged facing toward and aligning with said respective frame locker of said respective lens rim when said shelter frame is mounted in front of said frame body of said primary spectacle frame.

12. The magnetic shelter frame, as recited in claim 11, wherein a thickness of each of said two magnets is smaller than a depth of each of said two magnet housings so as to define two engagement grooves therein when said two magnets are respectively embedded in said two magnet housings for engaging with said two frame lockers of said primary spectacle frame.

13. The magnetic shelter frame, as recited in claim 12, wherein said bridge of said shelter frame is a U-shaped clip-bridge which comprises two rearwardly extending side wires adapted for supporting on two ends of said primary bridge of said frame body, and a downwardly curved clipping wire connecting between said two side wires and extending behind said primary bridge, wherein said clip-bridge is clipped on said primary bridge for interlocking therewith when said shelter frame is mounted in front of said primary spectacle frame.

14. The magnetic shelter frame, as recited in claim 1, wherein said two frame lockers of said two lens rims are respectively positioned adjacent to said two side extensions of said primary spectacle frame, wherein said two supporting arms of said two interlocking means of said magnetic shelter frame are rearwardly extended over said two side extensions, without contacting said two side extensions, to interlock with said two frame lockers respectively, so that said two magnetic seats secure said magnetic shelter frame in front of said primary spectacle frame.

15. The magnetic shelter frame, as recited in claim 14, wherein each of said magnetic seats comprises a magnet housing which is made of non-magnetic material and connected to said respective supporting arm, and a magnet mounted in said magnet housing which is arranged facing toward and aligning with said respective frame locker of said respective lens rim when said shelter frame is mounted in front of said frame body of said primary spectacle frame.

16. The magnetic shelter frame, as recited in claim 15, wherein a thickness of each of said two magnets is smaller than a depth of each of said two magnet housings so as to define two engagement grooves therein when said two magnets are respectively embedded in said two magnet housings for engaging with said two frame lockers of said primary spectacle frame.

17. The magnetic shelter frame, as recited in claim 1, wherein each of said magnetic seats comprises a magnet housing which is made of non-magnetic material and connected to said respective supporting arm, and a magnet mounted in said magnet housing which is arranged facing toward and aligning with said respective frame locker of said respective lens rim when said shelter frame is mounted in front of said frame body of said primary spectacle frame.

18. The magnetic shelter frame, as recited in claim 17, wherein a thickness of each of said two magnets is smaller than a depth of each of said two magnet housings so as to define two engagement grooves therein when said two magnets are respectively embedded in said two magnet housings for engaging with said two frame lockers of said primary spectacle frame.

19. The magnetic shelter frame, as recited in claim 1, wherein said two frame lockers of said two lens rims are respectively positioned adjacent to two ends of said bridge, wherein said two supporting arms of said two interlocking means of said magnetic shelter frame are rearwardly extended over said bridge to interlock with said two frame lockers respectively, so that said two magnetic seats secure said magnetic shelter frame in front of said primary spectacle frame.

20. The magnetic shelter frame, as recited in claim 19, wherein each of said magnetic seats comprises a magnet housing which is made of non-magnetic material and connected to said respective supporting arm, and a magnet mounted in said magnet housing which is arranged facing toward and aligning with said respective frame locker of said respective lens rim when said shelter frame is mounted in front of said frame body of said primary spectacle frame.

21. The magnetic shelter frame, as recited in claim 20, wherein a thickness of each of said two magnets is smaller than a depth of each of said two magnet housings so as to define two engagement grooves therein when said two magnets are respectively embedded in said two magnet housings for engaging with said two frame lockers of said primary spectacle frame.

22. The magnetic shelter frame, as recited in claim 19, wherein said bridge of said shelter frame is a U-shaped clip-bridge which comprises two rearwardly extending side wires adapted for supporting on two ends of said primary bridge of said frame body, and a downwardly curved clipping wire connecting between said two side wires and extending behind said primary bridge, wherein said clip-bridge is clipped on said primary bridge for interlocking therewith when said shelter frame is mounted in front of said primary spectacle frame.

23. The magnetic shelter frame, as recited in claim 1, wherein said two frame lockers of said two lens rims are rearwardly positioned at two lower sides of said two lens rims respectively, wherein said two supporting arms of said two interlocking means of said magnetic shelter frame are rearwardly extended over said two lower sides to interlock with said two frame lockers of said two lower sides of said primary spectacle frame respectively, so that said two magnetic seats secure said magnetic shelter frame in front of said primary spectacle frame.

24. The magnetic shelter frame, as recited in claim 23, wherein each of said magnetic seats comprises a magnet housing which is made of non-magnetic material and connected to said respective supporting arm, and a magnet mounted in said magnet housing which is arranged facing toward and aligning with said respective frame locker of said respective lens rim when said shelter frame is mounted in front of said frame body of said primary spectacle frame.

25. The magnetic shelter frame, as recited in claim 24, wherein a thickness of each of said two magnets is smaller than a depth of each of said two magnet housings so as to define two engagement grooves therein when said two magnets are respectively embedded in said two magnet housings for engaging with said two frame lockers of said primary spectacle frame.

26. The magnetic shelter frame, as recited in claim 23, wherein said bridge of said shelter frame is a U-shaped clip-bridge which comprises two rearwardly extending side wires adapted for supporting on two ends of said primary bridge of said frame body, and a downwardly curved clipping wire connecting between said two side wires and extending behind said primary bridge, wherein said clip-bridge is clipped on said primary bridge for interlocking therewith when said shelter frame is mounted in front of said primary spectacle frame.

27. The magnetic shelter frame, as recited in claim 1, wherein said bridge of said shelter frame is a U-shaped clip-bridge which comprises two rearwardly extending side wires adapted for supporting on two ends of said primary bridge of said frame body, and a downwardly curved clipping wire connecting between said two side wires and extending behind said primary bridge, wherein said clip-bridge is clipped on said primary bridge for interlocking therewith when said shelter frame is mounted in front of said primary spectacle frame.

28. The magnetic shelter frame, as recited in claim 1, wherein said bridge of said shelter frame is a U-shaped clip-bridge which comprises two rearwardly extending side wires adapted for supporting on two ends of said primary bridge of said frame body, and a downwardly curved clipping wire connecting between said two side wires and extending behind said primary bridge, wherein said clip-bridge is clipped on said primary bridge for interlocking therewith when said shelter frame is mounted in front of said primary spectacle frame.

29. A magnetic shelter frame constructed to mount on a primary spectacle frame which comprises a frame body for mounting a pair of lenses in position, wherein said frame body comprises a primary bridge connected between said pair of lenses and two side extensions provided at two outer sides of said lenses respectively, each of said side extensions having a hinge portion rearwardly extended therefrom for pivotally coupling a temple;

wherein said primary spectacle frame further comprises a pair of frame lockers which are two nuts for fastening said two side extensions to said two lenses respectively, wherein said two frame lockers are made of soft-magnetic metal having magnetic attraction ability;

said magnetic shelter frame supporting two auxiliary lenses and comprising a bridge extended between said two auxiliary lenses and two interlocking means provided at two sides of said auxiliary lenses respectively for interlocking with said two frame lockers of said frame body of said primary spectacle frame, wherein each said interlocking means comprises a supporting arm and a magnetic seat connected from said supporting arm;

wherein said two frame lockers are respectively positioned adjacent to said two side extensions of said primary spectacle frame, wherein said two supporting arms of said two interlocking means of said magnetic shelter frame are rearwardly extended over said two side extensions, without contacting said two side extensions, to interlock with said two frame lockers respectively;

wherein each of said magnetic seats comprises a magnet housing which is made of non-magnetic material and connected to said respective supporting arm, and a magnet mounted in said magnet housing which is arranged facing toward and aligning with said respective frame locker when said shelter frame is mounted in front of said frame body of said primary spectacle frame.

30. The magnetic shelter frame, as recited in claim 29, wherein a thickness of each of said two magnets is smaller than a depth of each of said two magnet housings so as to define two engagement grooves therein when said two magnets are respectively embedded in said two magnet housings for engaging with said two frame lockers of said primary spectacle frame.

31. A magnetic shelter frame constructed to mount on a primary spectacle frame which comprises a frame body for mounting a pair of lenses in position, wherein said frame body comprises a primary bridge connected between said pair of lenses and two side extensions provided at two outer sides of said lenses respectively, each of said side extensions having a hinge portion rearwardly extended therefrom for pivotally coupling a temple;

wherein said primary spectacle frame further comprises a pair of frame lockers which are two nuts for fastening said two side extensions to said two lenses respectively, wherein each of said frame lockers is made of magnetic attractable material;

said magnetic shelter frame supporting two auxiliary lenses and comprising a bridge extended between said two auxiliary lenses and two interlocking means provided at two sides of said auxiliary lenses respectively for interlocking with said two frame lockers of said frame body of said primary spectacle frame, wherein each said interlocking means comprises a supporting arm and a magnetic seat connected from said supporting arm;

wherein said two frame lockers are respectively positioned adjacent to two ends of said bridge, wherein said two supporting arms of said two interlocking means of said magnetic shelter frame are rearwardly extended over said bridge to interlock with said two frame lockers respectively;

wherein each of said magnetic seats comprises a magnet housing which is made of non-magnetic material and connected to said respective supporting arm, and a magnet mounted in said magnet housing which is arranged facing toward and aligning with said respective frame locker when said shelter frame is mounted in front of said frame body of said primary spectacle frame.

32. The magnetic shelter frame, as recited in claim 31, wherein a thickness of each of said two magnets is smaller than a depth of each of said two magnet housings so as to define two engagement grooves therein when said two magnets are respectively embedded in said two magnet housings for engaging with said two frame lockers of said primary spectacle frame.

\* \* \* \* \*